United States Patent
Li et al.

(10) Patent No.: US 9,138,718 B2
(45) Date of Patent: Sep. 22, 2015

(54) COMPACT CATALYTIC MEMBRANE REACTOR FOR CHEMICAL PROCESS INTENSIFICATION

(71) Applicants: Dongmei Li, Laramie, WY (US); Shuai Tan, Laramie, WY (US)

(72) Inventors: Dongmei Li, Laramie, WY (US); Shuai Tan, Laramie, WY (US)

(73) Assignee: University of Wyoming, Laramie, WY (US)

(*) Notice: Subject to any disclaimer, the term of this patent is extended or adjusted under 35 U.S.C. 154(b) by 0 days.

(21) Appl. No.: 14/300,894

(22) Filed: Jun. 10, 2014

(65) Prior Publication Data

US 2014/0363345 A1    Dec. 11, 2014

Related U.S. Application Data

(60) Provisional application No. 61/833,326, filed on Jun. 10, 2013.

(51) Int. Cl.
*B01J 19/24* (2006.01)
*C01B 3/16* (2006.01)

(52) U.S. Cl.
CPC ............... *B01J 19/2475* (2013.01); *C01B 3/16* (2013.01); *C01B 2203/0283* (2013.01); *C01B 2203/041* (2013.01); *C01B 2203/1041* (2013.01); *C01B 2203/1047* (2013.01); *C01B 2203/1076* (2013.01)

(58) Field of Classification Search
CPC .................. B01J 19/2475; B01J 2219/00907; C01B 3/16
See application file for complete search history.

(56) References Cited

U.S. PATENT DOCUMENTS

2009/0170964 A1    7/2009 Najafi et al.

OTHER PUBLICATIONS

Itoh, et al, Preparation of Thin Palladium Composite Membrane Tube by a CVD Technique and its Hydrogen Permselectivity, Catalysis Today, vol. 104, Jun. 2005, pp. 231-237.
Checchetto, et al, Palladium Membranes Prepared by R.F. Magnetron Sputtering for Hydrogen Purification, Surface and Coatings Technology, vol. 177-178, Jan. 2004, pp. 73-79.
Peters, et al, Hydrogen Transport through a Selection of Thin Pd-alloy Membranes: Membrane Stability, H2S Inhibition, and Flux Recovery in Hydrogen and Simulated WGS Mixtures, Catalysis Today, vol. 193, Oct. 2012, pp. 8-19.
George, Atomic Layer Deposition: An Overview, Chemical Reviews, vol. 110, Jan. 2010, pp. 111-131.
Leskelä, et al, Atomic Layer Deposition Chemistry: Recent Developments and Future Challenges, Angewandte Chemie International Edition, vol. 42, Nov. 2003, pp. 5548-5554.
Puurunen, et al, Hafnium Oxide Films by Atomic Layer Deposition for High-? Gate Dielectric Applications: Analysis of the Density of Nanometer-thin Films, Applied Physics, 2005, 4 pages.
Lu, et al, Coking- and Sintering-Resistant Palladium Catalysts Achieved Through Atomic Layer Deposition, Science, vol. 335, Mar. 2012, pp. 1205-1208.

(Continued)

*Primary Examiner* — Lessanework Seifu
(74) *Attorney, Agent, or Firm* — Patterson & Sheridan, LLP

(57) ABSTRACT

Embodiments disclosed herein generally relate to an apparatus for simultaneous generation and separation processes. The apparatus provides a membrane module including a substrate, a catalytic layer and a membrane layer. The catalytic layer includes nano-sized particles. As a result, the apparatus can operate in sulfur-free and sulfur-laden feed gas environment for water gas shift (WGS) reactions while maintaining high reaction conversion.

20 Claims, 5 Drawing Sheets

(56) References Cited

OTHER PUBLICATIONS

Aaltonen, et al, Atomic Layer Deposition of Noble Metals: Exploration of the Low Limit of the Deposition Temperature, Journal of Materials Research, vol. 19, Mar. 2011, pp. 3353-3358.

Hämäläinen, et al, Low Temperature Atomic Layer Deposition of Noble Metals using Ozone and Molecular Hydrogen as Reactants, Thin Solid Films, vol. 531, Mar. 2013, pp. 243-250.

Feng, et al, Subnanometer Palladium Particles Synthesized by Atomic Layer Deposition, ACS Catalysis, vol. 1, Jun. 2011, pp. 665-673.

Liang, et al, Scalable Synthesis of Palladium Nanoparticle Catalysts by Atomic Layer Deposition, Journal of Nanoparticle Research, vol. 14, Jun. 2012, pp. 1-12.

Sheridan, et al, Hydrogen Adsorption, Absorption, and Desorption at Palladium Nanofilms formed on Au(111) by Electrochemical Atomic Layer Deposition (E-ALD): Studies using Voltammetry and In Situ Scanning Tunneling Microscopy, The Journal of Physical Chemistry C, vol. 117, Aug. 2013, pp. 15728-15740.

Elam, et al, Atomic Layer Deposition of Palladium Films on Al2O3 Surfaces, Thin Solid Films, vol. 515, Dec. 2006, pp. 1664-1673.

Senkevich, et al, Substrate-Independent Palladium Atomic Layer Deposition, Chemical Vapor Deposition, vol. 9, Oct. 2003, pp. 258-264.

Eyck, et al, Plasma-Assisted Atomic Layer Deposition of Palladium, Chemical Vapor Deposition, vol. 11, Jan. 2005, pp. 60-66.

Eyck, et al, Plasma-Enhanced Atomic Layer Deposition of Palladium on a Polymer Substrate, Chemical Vapor Deposition, vol. 13, Jul. 2007, pp. 307-311.

Goldstein, et al, Enhancing the Nucleation of Palladium Atomic Layer Deposition on Al2O3 Using Trimethylaluminum to Prevent Surface Poisoning by Reaction Products, Applied Physics Letters, vol. 95, 2009, 3 pages.

Rohani, et al, Effect of Recycle Gas on Activity and Selectivity of Co—Ru/Al, World Academy of Science, Jun. 2009, pp. 549-553.

Chu, et al, Opportunities and Challenges for a Sustainable Energy Future, Nature, vol. 488, Aug. 2012, pp. 294-303.

Zhao, et al, Monodisperse Lanthanide Oxysulfide Nanocrystals, Journal of the American Chemical Society, vol. 128, Sep. 2006, pp. 11758-11759.

Valsamakis, et al, Sulfur-tolerant Lanthanide Oxysulfide Catalysts for the High-temperature Water-gas Shift Reaction, Applied Catalysis B: Environmental, May 2011, pp. 255-263.

Garcia-Garcia, et al, Catalytic Hollow Fibre Membrane Micro-reactor: High Purity H2 Production by WGS Reaction, Catalysis Today, vol. 171, Aug. 2011, pp. 281-289.

Goldstein, et al, Surface Poisoning in the Nucleation and Growth of Palladium Atomic Layer Deposition with Pd(hfac)2 and Formalin, Thin Solid Films, vol. 519, Jun. 2011, pp. 5339-5347.

Weber, et al, Atomic Layer Deposition of High-Purity Palladium Films from Pd(hfac)2 and H2 and O2 Plasmas, The Journal of Physical Chemistry C, vol. 118, Apr. 2014, pp. 8702-8711.

Basile, et al, Membranes for Membrane Reactors, John Wiley & Sons, 2010, p. 15.

Smart, et al, Ceramic Membranes for Gas Processing in Coal Gasification, Energy & Environmental Science, vol. 3, 2010, 11 pages.

Adrover, et al, Simulation of a Membrane Reactor for the WGS Reaction: Pressure and Thermal Effects, Chemical Engineering Journal, vol. 154, Nov. 2009, pp. 196-202.

Garcia-Garcia, et al, Applied Catalysis A: General, Applied Catalysis A, General, vol. 456, Apr. 2013, pp. 1-10.

Dong, et al, Dense Ceramic Catalytic Membranes and Membrane Reactors for Energy and Environmental Applications, Chemical Communications, vol. 47, 2011, p. 10886-10902.

Tan, et al, Membrane Microreactors for Catalytic Reactions, Journal of Chemical Technology & Biotechnology, vol. 88, Jul. 2013, pp. 1771-1779.

Gbenedio, et al, Catalysis Today, Catalysis Today, vol. 156, Oct. 2010, pp. 93-99.

Zhang, et al, Journal of Membrane Science, Journal of Membrane Science, vol. 451, Feb. 2014, pp. 285-292.

Wilhite, et al, High-Purity Hydrogen Generation in a Microfabricated 23?wt?% Ag-Pd Membrane Device Integrated with 8:1 LaNi0.95Co0.0503/Al2O3 Catalyst, Advanced Materials, vol. 18, Jul. 2006, pp. 1701-1704.

Hwang, et al, Fuel Processing Technology, Fuel Processing Technology, vol. 106, Feb. 2013, pp. 133-140.

Karpacheva, et al, Catalysis Today, Catalysis Today, vol. 186, Jun. 2012, pp. 7-11.

Wan, et al, TS-1 Oxidation of Aniline to Azoxybenzene in a Microstructured Reactor, Applied Catalysis A, General, vol. 281, Mar. 2005, pp. 285-293.

Yeung, et al, Experiments and Modeling of Membrane Microreactors, Catalysis Today, vol. 110, Dec. 2005, pp. 26-37.

Volkov, et al, Catalysis Today, Catalysis Today, vol. 193, Oct. 2012, pp. 31-36.

Wang, et al, Catalysis Today, Catalysis Today, vol. 193, Oct. 2012, pp. 151-157.

Bradford, et al, Monolith Loop Catalytic Membrane Reactor for Fischer-Tropsch Synthesis, Applied Catalysis A, General, vol. 283, Apr. 2005, pp. 39-46.

Kim, et al, Experimental Demonstration of Enhanced Hydrogen Permeation in Palladium via a Composite Catalytic-permselective Membrane, AIChE Journal, vol. 59, Sep. 2012, pp. 1627-1634.

Hu, et al, Bifunctional Palladium Composite Membrane for Hydrogen Separation and Catalytic CO Methanation, Chinese Journal of Catalysis, vol. 34, Sep. 2013, 6 pages.

Xuan, et al, Chemical and Transport Behaviors in a Microfluidic Reformer with Catalytic-support Membrane for Efficient Hydrogen Production and Purification, International Journal of Hydrogen Energy, vol. 37, Feb. 2012, pp. 2614-2622.

Tsuru, et al, A Bimodal Catalytic Membrane Having a Hydrogen-permselective Silica Layer on a Bimodal Catalytic Support: Preparation and Application to the Steam Reforming of Methane, Applied Catalysis A, General, vol. 302, Mar. 2006, pp. 78-85.

Qiao, et al, Hydrogen Separation through Palladium-copper Membranes on Porous Stainless Steel with Sol-gel Derived Ceria as Diffusion Barrier, Fuel, vol. 89, Jun. 2010, pp. 1274-1279.

Hla, et al, Catalysis Communications, Catalysis Communications, vol. 10, Feb. 2009, pp. 967-970.

Zhang, et al, Deactivation Characteristics of Fe—Al—Cu Water-gas Shift Catalysts in the Presence of H2S, Journal of Molecular Catalysis A: Chemical, vol. 309, Aug. 2009, pp. 63-70.

Inoglu, et al, Atomistic Thermodynamics Study of the Adsorption and the Effects of Water-gas Shift Reactants on Cu Catalysts under Reaction Conditions, Journal of Catalysis, vol. 261, Jan. 2009, pp. 188-194.

Machida, et al, Novel Oxygen Storage Mechanism Based on Redox of Sulfur in Lanthanum Oxysulfate/Oxysulfide, Chemical Communications, 2004, p. 662-663.

Hulteberg, Sulphur-tolerant Catalysts in Small-scale Hydrogen Production, a Review, International Journal of Hydrogen Energy, vol. 37, Mar. 2012, pp. 3978-3992.

Machida, et al, Large-Capacity Oxygen Storage by Lanthanide Oxysulfate/Oxysulfide Systems, Chemistry of Materials, vol. 17, Mar. 2005, pp. 1487-1492.

Zhao, et al, Pyrolysis of Single Molecular Precursor for Monodisperse Lanthanide Sulfide/oxysulfide Nanocrystals, Journal of Materials Chemistry, vol. 18, 2008, p. 949-953.

He, et al, Remarkable Optical and Magnetic Properties of Ultra-thin Europium Oxysulfide Nanorods, Journal of Materials Chemistry, vol. 22, 2012, p. 16728-16731.

Reddy, et al, Journal of Catalysis, Journal of Catalysis, vol. 282, Sep. 2011, pp. 258-269.

Shishido, et al, Cu/Zn-based Catalysts Improved by Adding Magnesium for Water-gas shift Reaction, Journal of Molecular Catalysis A: Chemical, vol. 253, Jul. 2006, pp. 270-278.

Gamboa-Rosales, et al., Chemical Engineering Journal, Chemical Engineering Journal, Jul. 2012, pp. 49-56.

Nagai, et al, Applied Catalysis A: General, Applied Catalysis A, General, vol. 383, Jul. 2010, pp. 58-65.

(56) References Cited

OTHER PUBLICATIONS

Schaidle, et al, Journal of Catalysis, Journal of Catalysis, vol. 272, Jun. 2010, pp. 235-245.
Ockwig, et al, Membranes for Hydrogen Separation, Chemical Reviews, vol. 107, Oct. 2007, pp. 4078-4110.
Adhikari, et al, Hydrogen Membrane Separation Techniques, Industrial & Engineering Chemistry Research, vol. 45, Feb. 2006, pp. 875-881.
DOE, Report of the DOE Workshop on Hydrogen Separations and Purification, Mar. 2005, pp. 1-33.
Caravella, et al, Sieverts Law Empirical Exponent for Pd-Based Membranes: Critical Analysis in Pure H2 Permeation, The Journal of Physical Chemistry B, vol. 114, May 2010, pp. 6033-6047.
Nair, et al, Electroless Plating and Permeation Features of Pd and Pd/Ag Hollow Fiber Composite Membranes, Journal of Membrane Science, vol. 288, Feb. 2007, pp. 67-84.
Tong, et al, A Novel Method for the Preparation of Thin Dense Pd Membrane on Macroporous Stainless Steel Tube Filter, Journal of Membrane Science, vol. 260, Sep. 2005, pp. 10-18.
Okazaki, et al, Journal of Membrane Science, Journal of Membrane Science, vol. 366, Jan. 2011, pp. 212-219.
Zhang, et al, Journal of Membrane Science, Journal of Membrane Science, vol. 387-388, Jan. 2012, pp. 24-29.
Ryi, et al, Novel Non-alloy Ru/Pd Composite Membrane Fabricated by Electroless Plating for Hydrogen Separation, International Journal of Hydrogen Energy, vol. 36, Jul. 2011, pp. 9335-9340.
Lim, et al, Journal of Membrane Science, Journal of Membrane Science, vol. 378, Aug. 2011, pp. 179-185.

COMPACT CATALYTIC MEMBRANE REACTOR FOR CHEMICAL PROCESS INTENSIFICATION

CROSS-REFERENCE TO RELATED APPLICATIONS

This application claims benefit of U.S. Provisional Patent Application Ser. No. 61/833,326, filed Jun. 10, 2013, which is herein incorporated by reference.

BACKGROUND

1. Field

Embodiments described herein generally relate to an apparatus for simultaneous generation and separation processes. More specifically, embodiments include a membrane reactor for use in an apparatus for gas to gas or gas to liquid simultaneous generation and separation processes.

2. Description of the Related Art

Coal and natural gas resources are projected to provide greater than 40% of global energy demand over the next twenty plus years. In order to abate the global warming by reducing greenhouse gas emission in power plants, industries, transportation, etc., advanced technologies are being developed to enable clean, efficient and environmentally friendly use of these energy resources. As one of the advanced conversion technologies, coal gasification provides an efficient and flexible approach to utilize abundant energy resources with minimized pollution to the environment. During a coal gasification process, coal is heated and exposed to oxygen and steam, and the oxygen and water molecules oxidize the coal and produce a gaseous mixture of carbon dioxide, carbon monoxide, water vapor and hydrogen. The gaseous mixture then undergoes a water gas shift (WGS) reaction to produce hydrogen. Various membrane reactors are used to simultaneously generate and separate hydrogen.

One example of a membrane reactor is a compact catalytic membrane reactor (CCMR). A CCMR typically includes a membrane module that has a catalytic film. The catalytic film includes a porous layer having nano-sized catalysts deposited therein. As reactant gases pass through the catalytic film, hydrogen gas is generated. The catalytic film is also integrated with a membrane layer permeable to the hydrogen gas. As the hydrogen gas permeates through the membrane layer, the thermodynamics of the reaction are shifted toward hydrogen production. The hydrogen gas is produced and separated simultaneously in the CCMR. However, persisting issues with membranes or membrane modules for simultaneous hydrogen generation and separation include sulfur poisoning and low hydrogen flux.

Thus, an improved apparatus for simultaneous generation and separation processes is needed.

SUMMARY

Embodiments disclosed herein generally relate to an apparatus for simultaneous generation and separation processes. The apparatus provides a membrane module including a substrate, a catalytic film and a membrane layer. The catalytic film includes nano-sized particles. The nano-sized particles enable the apparatus to operate in sulfur-free and sulfur-laden feed gas environments for WGS reactions while maintaining high reaction conversion.

In one embodiment, an apparatus for simultaneous generation and separation processes is disclosed. The apparatus includes a membrane module that includes a substrate and a catalytic film disposed adjacent to the substrate. The catalytic film includes nano-sized particles. The membrane reactor further includes a palladium layer formed adjacent the substrate.

In another embodiment, an apparatus for simultaneous generation and separation processes is disclosed. The apparatus includes a catalytic membrane module. The catalytic membrane module includes a porous support layer and a catalytic film disposed adjacent the porous support layer. The catalytic film includes an oxide layer impregnated with nano-sized lanthanide containing particles. The catalytic membrane reactor further includes a membrane layer disposed adjacent the catalytic film.

In another embodiment, an apparatus for simultaneous generation and separation processes is disclosed. The apparatus includes a catalytic membrane module. The catalytic membrane module includes a porous support layer and a catalytic film disposed adjacent the porous support layer. The catalytic film includes an oxide layer impregnated with nano-sized lanthanide containing particles. The catalytic membrane reactor further includes a membrane layer disposed adjacent the porous support layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally relate to an apparatus for simultaneous generation and separation processes.

The apparatus provides a membrane module including a substrate, a catalytic film and a membrane layer. The catalytic film includes nano-sized particles. The nano-sized particles enable the apparatus to operate in sulfur-free and sulfur-laden feed gas environments for WGS reactions while maintaining high reaction conversion.

Figure 1:
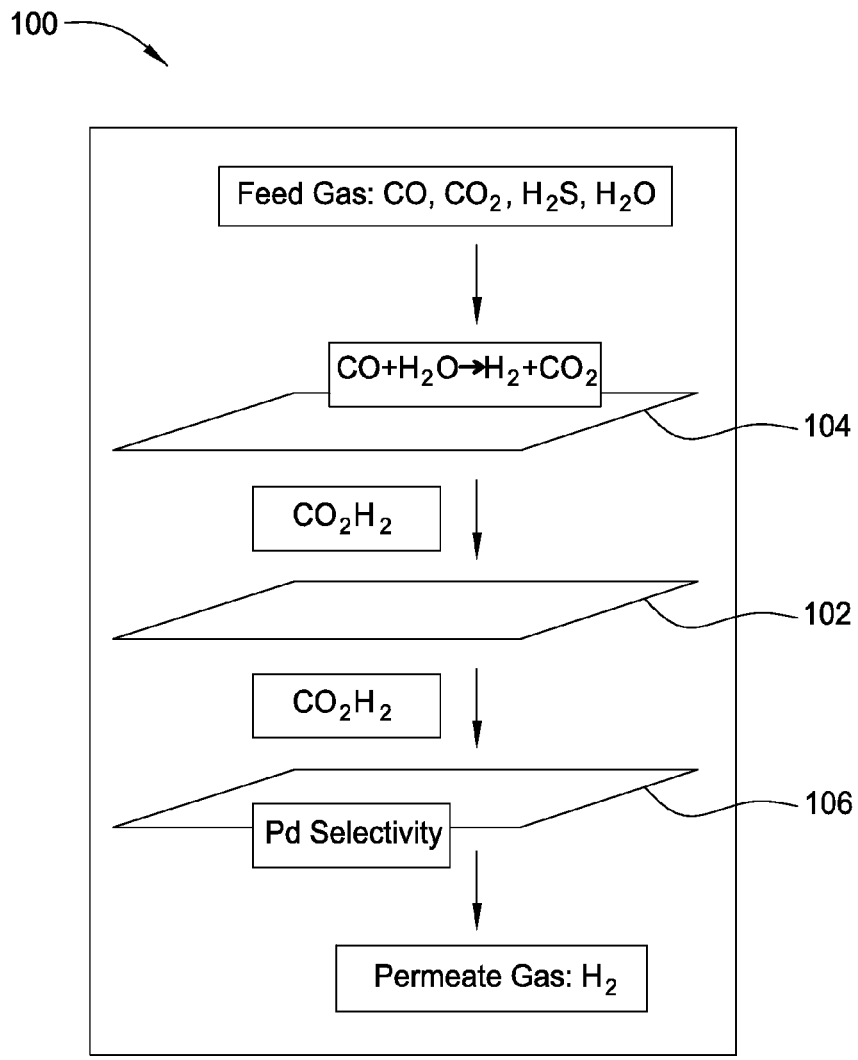
FIG. 1 schematically illustrates a membrane module according to embodiments described herein.

FIG. 1 schematically illustrates a membrane module 100 according to embodiments described herein. The membrane module 100 may be used in any suitable membrane reactor, such as a micro-membrane reactor (MMR). The membrane module 100 includes a substrate 102 for supporting a catalytic layer 104 and a palladium (Pd) layer 106. The membrane module 100 may be used in any gas to gas or gas to liquid simultaneous generation and separation processes. In one embodiment, the membrane module 100 is used for simultaneous hydrogen generation and separation. The substrate 102 may be a porous material such as porous stainless steel (SS), porous ceramic, or an oxide layer. In one embodiment, the substrate 102 is a porous $ZrO_2$ substrate. The catalytic layer 104 may be coated on the substrate 102. The catalytic layer 104 may include sulfur tolerant catalysts, such as nano-sized particles. The nano-sized particles have a particle size in the nanometer range. In one example, the nano-sized particles comprise a nano-rod structure having a length dimension between about 4 nm and about 10 nm, such as about 7 nm and a width dimension between about 1 nm and about 3 nm, such as about 2 nm.

In one embodiment, nano-sized particles comprise a lanthanide containing material such as lanthanum oxysulfide, cerium oxysulfide, or europium oxysulfide. Nano-sized particles have a much larger Brunauer-Emmett-Teller (BET) surface area compared to conventional micron-sized catalysts. A comparison of BET surface areas for different catalysts is shown in the table below. As shown in the table, nano-sized lanthanide containing particles have the highest BET surface area (403 $m^2/g$). The catalytic layer 104 having nano-sized lanthanide containing particles is believed to be stable and efficient in both sulfur-rich and sulfur-free gas stream and there is little or no permanent sulfur poisoning due to sulfur desorption on the large surface of nano-sized lanthanide containing particles. The pores in the substrate 102 act as a physical barrier, allowing for maximized catalyst surface area/catalyst mass and reduced or eliminated coking.

| Sample | BET surface area ($m^2/g$) |
|---|---|
| Fe-only | 20 |
| Fe—Al—Cu | 56 |
| Fe/Ce/Cr | 150 |
| Cu/MgO/ZnO | 81.1 (74.7) |
| 20% $CuO/CeO_2$ | 122 |
| Co/Ce | 87 (112) |
| 5 wt % $Al_2O_3$/ $Co_{48}Mo_{48}K_2Zr_2$ | 96 |
| $Mo_2C$ | 98 |
| $Pt/Mo_2C$ | 70 |
| $La_2O_2S$ | 64.2 |
| Nano-$Eu_2O_2S$ | 403 |

The catalytic layer may include Pd particles that are deposited thereon using atomic layer deposition (ALD). As a result of forming Pd particles in the catalytic layer using ALD, sulfur can strongly dissolve on the surface of Pd, but not on the nano-sized lanthanide containing particles. Thus, a more efficient catalytic activation may be achieved. In addition, after the deposition of the Pd particles, the nano-sized lanthanide containing particles are partially surrounded by the ALD Pd particles, which can block sulfur from going into the Pd layer 106 to keep the selectivity of the Pd layer 106 stable. The Pd layer 106 may be formed using ALD so the Pd layer 106 has a high purity, which leads to increased hydrogen selectivity.

Figure 2:
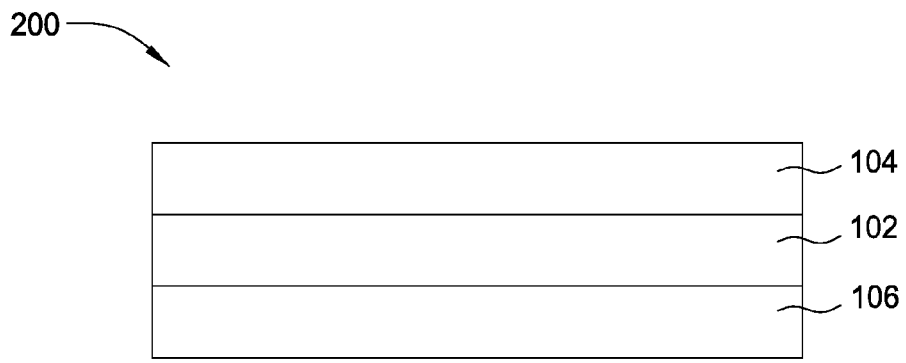
FIG. 2 schematically illustrates a membrane module for use in an apparatus for simultaneous generation and separation processes according to embodiments described herein.

FIG. 2 illustrates a membrane module 200 for use in an apparatus for simultaneous generation and separation processes according to embodiments described herein. The membrane module 200 may be placed in any suitable membrane reactor for gas to gas or gas to liquid generation and purification, such as hydrogen generation and purification. The membrane module 200 includes the catalytic layer 104, the Pd layer 106 and the substrate 102 disposed between the catalytic layer 104 and the Pd layer 106. As shown in FIG. 2, the layers 102, 104, 106 are substantially flat.

Figure 3:
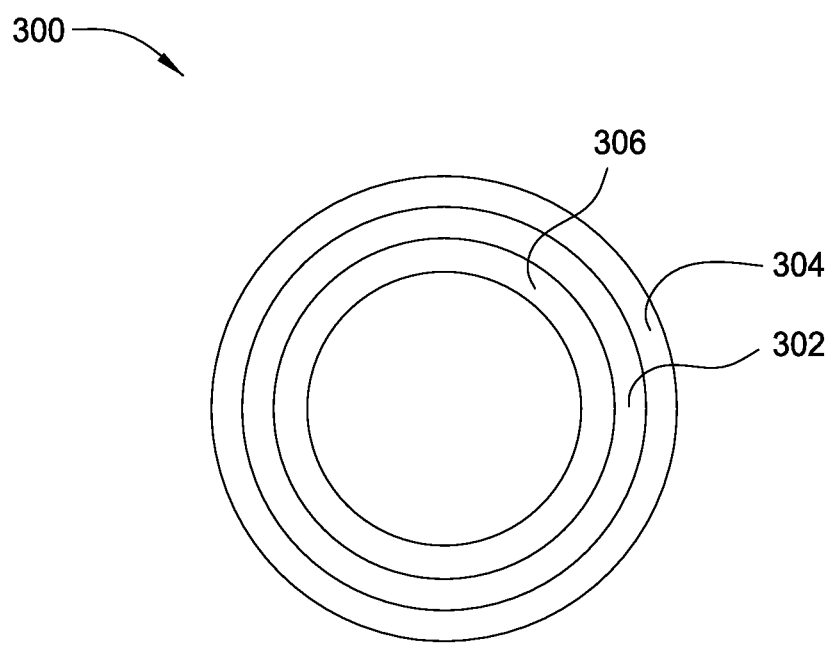
FIG. 3 is a schematic cross sectional view of a membrane module for use in an apparatus for simultaneous generation and separation processes according to embodiments described herein.

FIG. 3 is a schematic cross sectional view of a membrane module 300 for use in an apparatus for simultaneous generation and separation processes according to embodiments described herein. The membrane module 300 may be placed in any suitable membrane reactor for gas to gas or gas to liquid generation and purification, such as hydrogen generation and separation reactors. The membrane module 300 is a tube having three layers 302, 304, 306. The inner layer 306 may comprise the same material as the Pd layer 106, the middle layer 302 may comprise the same material as the substrate 102, and the outer layer 304 may comprise the same material as the catalytic layer 104. In one embodiment, the middle layer 302 is a $ZrO_2$ tube. The outer surface of the $ZrO_2$ tube may be treated with oxygen plasma for about 20 minutes. The plasma treatment may be performed at a power of about 26.9 W and a pressure of about 505 mTorr. The $ZrO_2$ tube is then dipped into a toluene solution containing nano-sized lanthanide containing particles, such as europium oxysulfide, for about 24 hours while the toluene solution is maintained at about 130 degrees Celsius. The plasma treatment improves adhesion between the nano-sized particles and the outer surface of the $ZrO_2$ tube. Then the $ZrO_2$ tube is placed in an oven at a temperature of about 250 degrees Celsius for about 12 hours to form the outer layer 304 containing nano-sized lanthanide containing particles. The table below shows the percentages of different elements at the surface of the outer layer 304.

| Element | Weight % | Atomic % |
|---|---|---|
| Zr | 3.55 | 1.3 |
| Eu | 53.09 | 11.65 |
| S | 3.23 | 3.36 |
| O | 40.14 | 83.69 |

Figures 4, 5, 6:
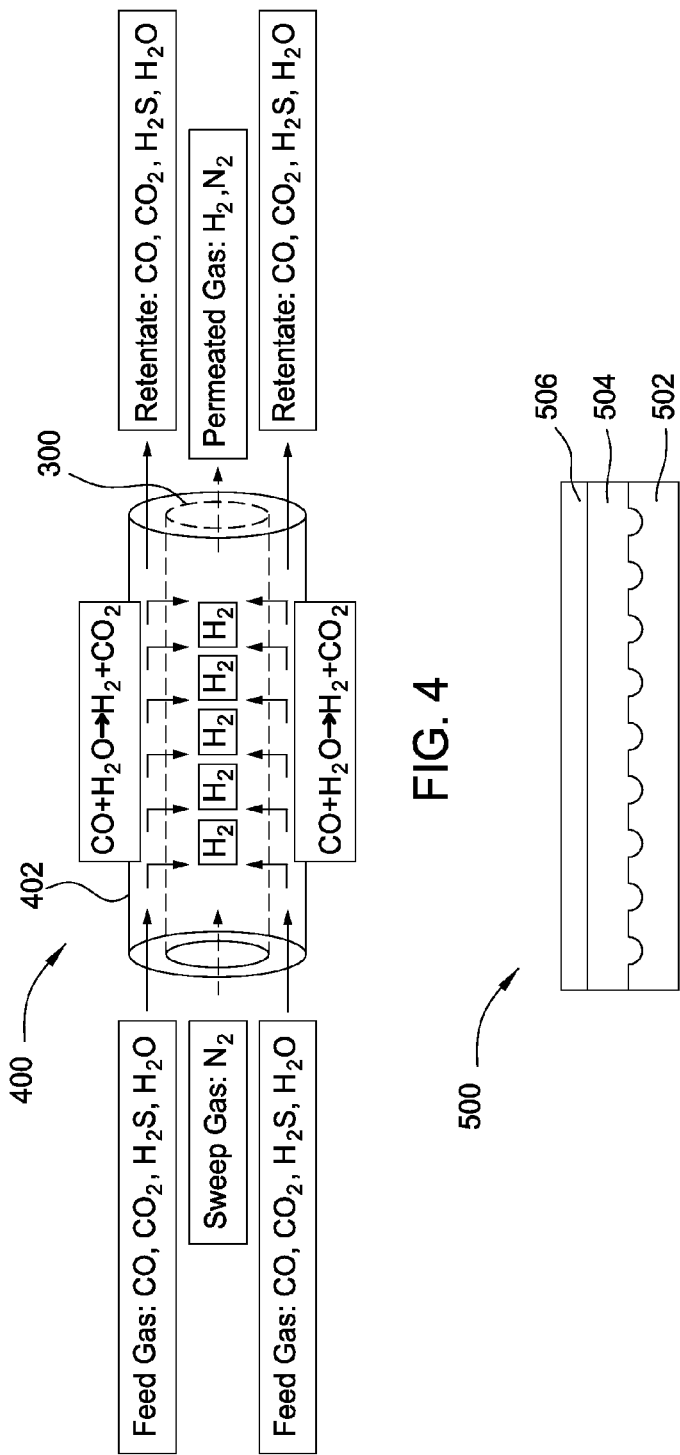
FIG. 4 schematically illustrates an apparatus including the membrane module shown in FIG. 3 according to embodiments described herein.
FIG. 5 schematically illustrates a membrane module for use in an apparatus for simultaneous generation and separation processes according to embodiments described herein.
FIG. 6 schematically illustrates a membrane module for use in an apparatus for simultaneous generation and separation processes according to embodiments described herein.

FIG. 4 schematically illustrates an apparatus 400 including the membrane module 300 shown in FIG. 3 according to embodiments described herein. The apparatus 400 may be a MMR having an outer wall 402 and the membrane module 300. During operation, feed gases flow through the space between the outer wall 402 and the structure 300. The gases react with the nano-sized particles in the outer layer 304 to form hydrogen, which then permeates through the middle and inner layers 302, 306. Due to the large surface area of the nano-sized lanthanide containing particles in the outer layer 304 and the ALD Pd layer of the inner layer 306, the WGS reaction for producing hydrogen is more efficient and stable in both sulfur-free and sulfur-laden environments and the reaction thermodynamics are shifted toward hydrogen production with maximized hydrogen permeability.

FIG. 5 schematically illustrates a membrane module 500 for use in an apparatus for simultaneous generation and separation processes according to another embodiment described herein. The membrane module 500 may be placed in any suitable membrane reactor for gas to gas or gas to liquid generation and purification, such as hydrogen generation and separation reactors. An example of the membrane reactor is a compact catalytic membrane reactor (CCMR). The membrane module 500 includes a catalytic film 504, a membrane layer 506 and a porous support layer 502 disposed between the catalytic film 504 and the membrane layer 506. The porous support layer 502 may comprise the same material as the substrate 102 described in FIG. 1 and the membrane layer 506 may comprise the same material as the Pd layer 106 described in FIG. 1. The catalytic film 504 may include a layer, such as a porous oxide layer, that is impregnated with nano-sized particles. In one embodiment, the porous oxide layer comprises $ZrO_2$ having a pore size of about 100 nm and the nano-sized particles comprise lanthanide oxysulfide, which are disposed in the pores of the porous oxide layer. In one embodiment, the lanthanide oxysulfide is europium oxysulfide. The nano-sized particles may be impregnated in the layer by any suitable impregnating method, such as a sol-gel process or ultrasonic spraying.

The membrane layer 506 may be disposed on the catalytic film 504, which may be disposed on the porous support layer 502. In one embodiment, the membrane layer 506 is deposited on the catalytic film 504 by ALD. The ALD Pd membrane layer 506 has a suitable thickness which provides for improved gas permeability without compromising selectivity.

FIG. 6 schematically illustrates a membrane module 600 for use in an apparatus for simultaneous generation and separation processes according to another embodiment described herein. The structure 600 may be placed in any suitable membrane reactor for gas to gas or gas to liquid generation and purification, such as hydrogen generation and purification. An example of the membrane reactor is a CCMR. The membrane module 600 includes a catalytic film 604, a membrane layer 606 and a porous support layer 602 disposed between the catalytic film 604 and the membrane layer 606. The porous support layer 602 may comprise the same material as the porous support layer 502 described in FIG. 5, the membrane layer 606 may comprise the same material as the membrane layer 506 described in FIG. 5, and the catalytic film 604 may comprise the same material as the catalytic film 504 described in FIG. 5. Unlike the structure 500 shown in FIG. 5, the membrane layer 606 is disposed on the porous support layer 602.

In one embodiment, the porous support layer 602 may comprise porous stainless steel and the membrane layer 606 is deposited on the porous support layer 602 by ALD using $Pd(hfac)_2$ and formalin as precursors. A seed layer (not shown) may be disposed between the porous support layer 602 and the membrane layer 606 to improve adhesion. The seed layer may comprise alumina. The configuration of the structure 600 shown in FIG. 6 can prevent the Pd membrane layer 606 from sulfur poisoning by shrinking the pore size of the catalytic film 604 with deposited nano-sized particles and sulfur adsorption on the particles. The structure 600 is not limited to gas separation and can be applied to liquid-base reactions/separations and gas-liquid-solid processes with heterogeneous catalysts, such as Fisher-Tropsch synthesis to produce liquid fuels.

Figure 7:
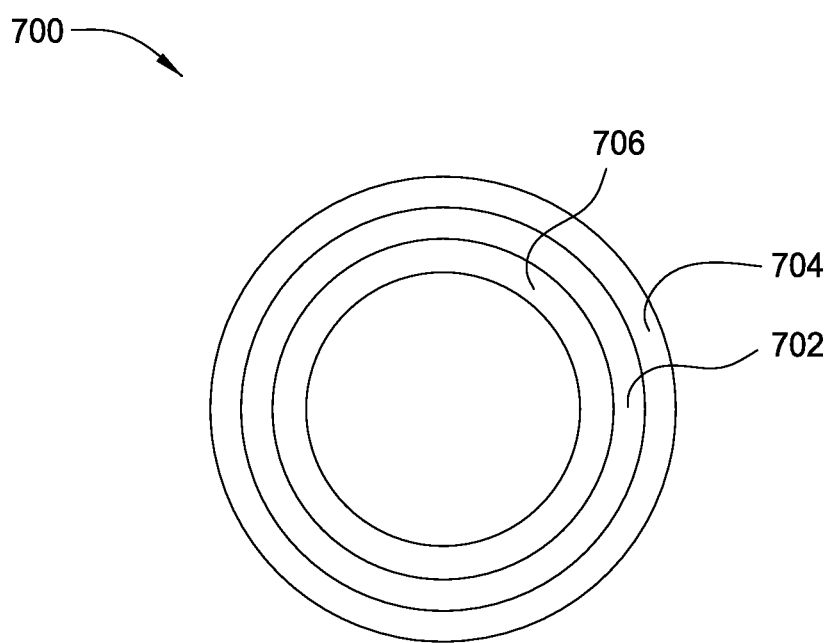
FIG. 7 is a schematic cross sectional view of a membrane module for use in an apparatus for simultaneous generation and separation processes according to embodiments described herein.

FIG. 7 is a schematic cross sectional view of a membrane module 700 for use in an apparatus for simultaneous generation and separation processes according to another embodiment described herein. The membrane module 700 may be placed in any suitable membrane reactor for gas to gas or gas to liquid generation and purification, such as hydrogen generation and separation reactors. The membrane module 700 is a tube having three layers 702, 704, 706. The inner layer 706 may comprise the same material as the membrane layer 606, the middle layer 702 may comprise the same material as the porous support layer 602 and the outer layer 604 may comprise the same material as the catalytic film 604. In one embodiment, the middle layer 702 comprises porous stainless steel, which is selected due to mechanical stability at high operating pressure and temperature. The catalytic layer 704 is disposed on the outer surface of the middle layer 702. The catalytic film 704 may comprise a layer, such as a $ZrO_2$ layer, that is impregnated with nano-sized particles, such as nano-sized lanthanide containing particles. In one embodiment, the catalytic film has a thickness of about 20 microns to about 200 microns, which can greatly enhance hydrogen production efficiency by circumventing mass transfer limitations with a much shorter transport path. In addition, heat management challenges can also be addressed for exothermic reactions with the significantly increased gas flow rates on both feed and permeate sides. The porous $ZrO_2$ layer also provides higher surface area per volume to increase catalytic contact area for reactants, resulting in higher conversion and production yield.

Before testing the membrane module 700 in a WGS reaction, permeability testing was carried out with 15% $H_2$ balanced in $N_2$ at the total flow rate of 1 SLPM, 50 psi system pressure and room temperature. A similar CCMR configuration by coating porous stainless steel with micron-sized CuO/$Al_2O_3$ was recently reported and tested in the same testing condition as discussed above. Table shown below summarizes the comparison between the CCMR with nano-sized europium oxysulfide and CuO/$Al_2O_3$. The catalytic film 704 with impregnated nano europium oxysulfide is about 30 microns thick, which is much thinner than the 500 micron CuO/$Al_2O_3$ catalytic film. Consequently, the $H_2$ permeance through the catalytic layer 704 is about 15 times higher than that through the CuO/$Al_2O_3$ layer. Therefore, the nano-sized catalyst facilitates utilization of thin catalytic films, which exhibit high $H_2$ permeability.

| Catalytic Tube | Nano-$Eu_2O_2S$ catalytic film + SS | CuO/$Al_2O_3$ catalytic film + SS* | Ratio |
|---|---|---|---|
| Thickness (μm) | ~30 | ~500 | 16.67 |
| Balance Gas Permeate (mol/$m^2$ s $Pa^{0.5}$) | 3.84E−06 ($N_2$) | 2.85E−07 (Ar) | — |
| $H_2$ Permeate (mol/$m^2$ s $Pa^{0.5}$) | 1.02E−05 | 6.51E−07 | 15.67 |
| Selectivity | 2.65 ($H_2/N_2$) | 2.28 ($H_2$/Ar) | — |

*Comparison sample using micron-sized particles that do not contain lanthanide

Figure 8:
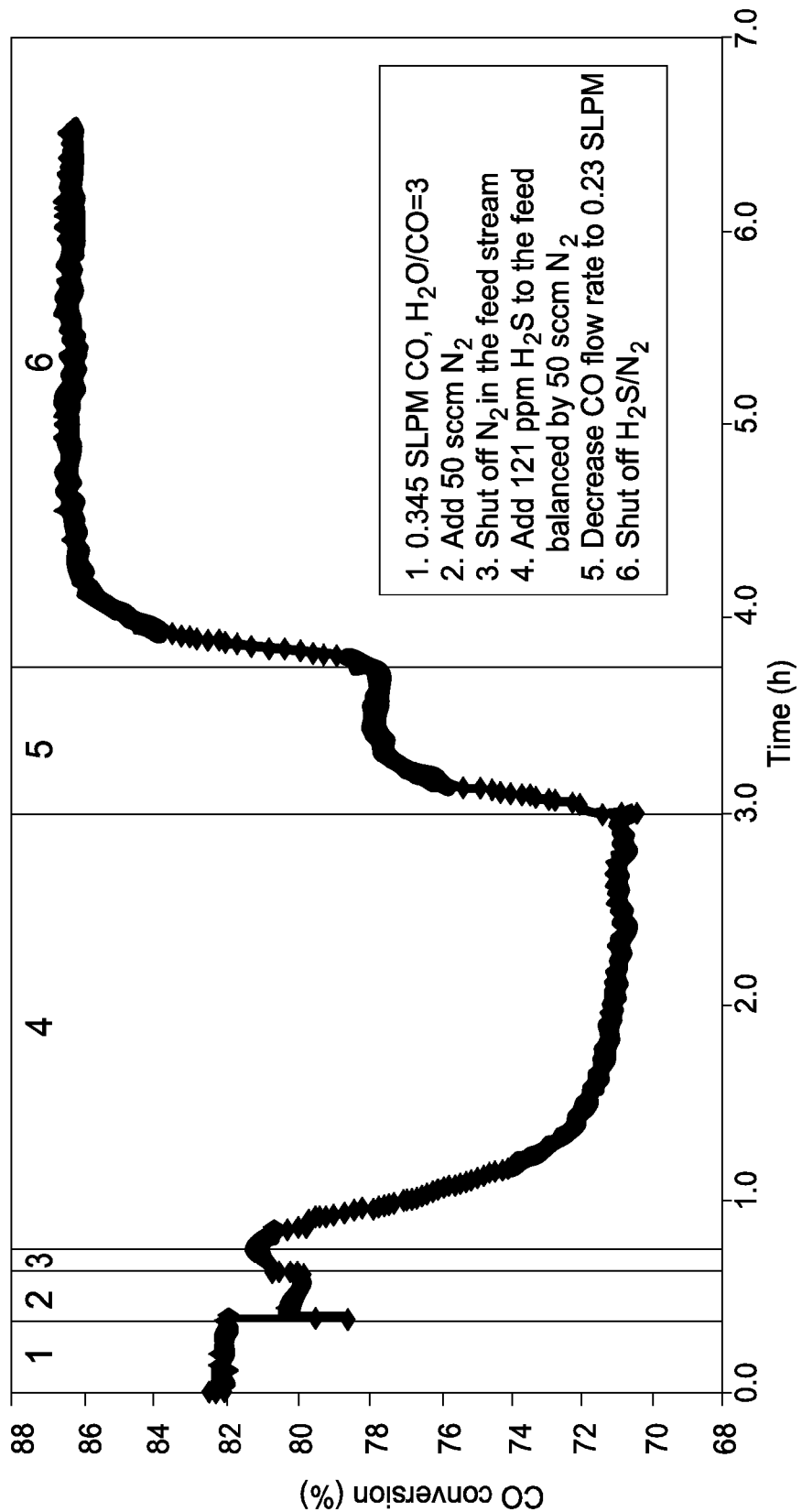
FIG. 8 is a chart illustrating sulfur tolerant testing of the membrane module shown in FIG. 7 according to one embodiment described herein.

FIG. 8 is a chart illustrating sulfur tolerant testing of the membrane module 700 according to one embodiment. The sulfur tolerance testing of the nano-sized $Eu_2O_2S$ catalysts indicated that hydrogen sulfide ($H_2S$) did hinder CO conversion rate, resulting in an approximately 10% decrease in CO conversion after adding 121 ppm of $H_2S$ in 0.345 SLPM of CO flow rate. However, after removing $H_2S$ from the feed stream, the CO conversion rate of the WGS reaction was largely recovered to what was in a sulfur-free environment after one hour.

The table shown below compares the activity of nano-catalysts for WGS reactions with and without sulfur to the micron-sized lanthanide oxysulfide catalysts and commercial Fe—Cr catalysts. The comparison shows that the nano-catalysts have better or comparable performance in CO conversion and impressive sulfur-resistance, despite different feed concentrations of CO (the micro-sized catalysts were tested in 2% CO-10% $H_2O$—$N_2$ feed). Compared to the micron-sized lanthanide oxysulfide catalysts, nanoscale $Eu_2O_2S$ demonstrated higher CO conversion at lower reaction temperature. At 550° C., commercial Fe—Cr catalysts achieved 90% CO conversion, where the micron-sized lanthanide oxysulfide catalysts only achieved <50% CO conversion. In addition, the micron-sized catalysts require a temperature of 650° C. or higher to obtain enhanced conversion. On the contrary, the nano-$Eu_2O_2S$ catalysts can achieve 92% CO conversion at 550° C., which is 2% higher than the commercial iron catalysts, with enhanced CO conversion being obtained at a reaction temperature 100° C. lower than with the micro-sized catalysts. After adding 121 ppm sulfur in the feed, iron catalyst activity decreased by 50% relative to the CO conversion in a sulfur-free environment. However, the $Eu_2O_2S$ nano-catalyst activity decreased by between about 10% and about 20% relative to CO conversion in a sulfur-free environment. The $Eu_2O_2S$ nano-catalyst significantly outperformed the commercial iron catalysts under similar conditions. It is also worth noting that 97% of the $Eu_2O_2S$ nano-catalyst activity was recovered after shutting off the 121 ppm $H_2S$ in the feed for half an hour. The higher active surface area of nanoscale $Eu_2O_2S$ for sulfur adsorption may have slightly compromised the sulfur-tolerence of the nanoscale $Eu_2O_2S$ compared to micron-sized lanthanide oxysulfide catalysts.

| Temperature (° C.) | $H_2S$ concentration (ppm) | | | | | |
|---|---|---|---|---|---|---|
| | 0 | | | 121 | | |
| | Fe/Cr | Micron | Nano | Fe/Cr | Micron | Nano |
| 400 | 79 | ~ | ~ | 50 | ~ | ~ |
| 550 | 90 | 35 | 92.2 | 57 | ~ | 70 |
| 600 | 87 | 50 | 88.7 | 54 | 30 | ~ |
| 650 | 85 | 50 | 90.2 | 53 | 50 | 77.9 |

While the foregoing is directed to embodiments, other and further embodiments of the disclosure may be devised without departing from the basic scope thereof, and the scope thereof is determined by the claims that follow.

What is claimed is:

1. An apparatus for simultaneous generation and separation processes, comprising a membrane module, wherein the membrane module comprises:
    a substrate;
    a catalytic film disposed adjacent the substrate, wherein the catalytic film comprises nano-sized particles; and
    a palladium layer formed adjacent the substrate.

2. The apparatus of claim 1, wherein the substrate, the catalytic film and the palladium layer are cylindrical.

3. The apparatus of claim 1, wherein the nano-sized particles comprise lanthanide oxysulfide.

4. The apparatus of claim 1, wherein the nano-sized particles further comprise lanthanum oxysulfide, cerium oxysulfide, or europium oxysulfide.

5. The apparatus of claim 1, wherein the substrate comprises zirconium oxide.

6. The apparatus of claim 1, wherein the palladium layer is formed using atomic layer deposition.

7. An apparatus for simultaneous generation and separation processes comprising a catalytic membrane module, wherein the catalytic membrane module comprises:
    a porous support layer;
    a catalytic film disposed adjacent the porous support layer, wherein the catalytic film comprises an oxide layer impregnated with nano-sized lanthanide containing particles; and
    a membrane layer disposed adjacent the catalytic film.

8. The apparatus of claim 7, wherein the porous support layer, the catalytic film and the membrane layer are cylindrical.

9. The apparatus of claim 7, wherein the porous support layer comprises porous stainless steel or a ceramic material.

10. The apparatus of claim 7, wherein the nano-sized lanthanide containing particles comprises lanthanide oxysulfide.

11. The apparatus of claim 7, wherein the oxide layer comprises zirconium oxide.

12. The apparatus of claim 7, wherein the catalytic membrane module is configured to be used in a compact catalytic membrane reactor.

13. An apparatus for simultaneous generation and separation processes comprising a catalytic membrane module, wherein the catalytic membrane module comprises:
    a porous support layer;
    a catalytic film disposed adjacent the porous support layer, wherein the catalytic film comprises an oxide layer impregnated with nano-sized lanthanide containing particles; and
    a membrane layer disposed adjacent the porous support layer.

14. The apparatus of claim 13, wherein the porous support layer, the catalytic film and the membrane layer are cylindrical.

15. The apparatus of claim 13, wherein the porous support layer comprises porous stainless steel or a ceramic material.

16. The apparatus of claim 13, wherein the nano-sized lanthanide containing particles comprises lanthanide oxysulfide.

17. The apparatus of claim 16, wherein the lanthanide containing material further comprises europium oxysulfide.

18. The apparatus of claim 13, wherein the oxide layer comprises zirconium oxide.

19. The apparatus of claim 13, wherein the catalytic membrane module is configured to be used in a compact catalytic membrane reactor.

20. The apparatus of claim 13, wherein the membrane layer comprises palladium, and wherein the palladium is deposited using atomic layer deposition.

* * * * *